United States Patent
Sukman et al.

(10) Patent No.: US 6,313,433 B1
(45) Date of Patent: Nov. 6, 2001

(54) LASER MATERIAL PROCESSING SYSTEM WITH MULTIPLE LASER SOURCES APPARATUS AND METHOD

(75) Inventors: Yefim P. Sukman; Christian J. Risser, both of Scottsdale; Edwin W. Gorham; David W. Schultz, both of Phoenix, all of AZ (US)

(73) Assignee: Universal Laser Systems, INC, Scottsdale, AZ (US)

( * ) Notice: Subject to any disclaimer, the term of this patent is extended or adjusted under 35 U.S.C. 154(b) by 0 days.

(21) Appl. No.: 09/542,490

(22) Filed: Apr. 3, 2000

(51) Int. Cl.[7] .............................. B23K 26/06; B23K 26/38

(52) U.S. Cl. .................. 219/121.67; 219/121.76; 219/121.78

(58) Field of Search ........... 219/121.61, 121.67–121.72, 219/121.76, 121.78

(56) References Cited

U.S. PATENT DOCUMENTS

| | | | |
|---|---|---|---|
| 3,710,798 | * | 1/1973 | Bredemeier ..................... 219/121.72 |
| 3,897,150 | | 7/1975 | Bridges et al. . |
| 4,011,445 | | 3/1977 | O'Meara . |
| 4,226,536 | | 10/1980 | Dreyfus et al. . |
| 4,241,319 | | 12/1980 | Papayoanou . |
| 4,325,640 | | 4/1982 | Dreyfus et al. . |
| 4,391,518 | | 7/1983 | Owen et al. . |
| 4,535,218 | | 8/1985 | Krause et al. . |
| 4,645,547 | | 2/1987 | Krause et al. . |
| 4,733,252 | | 3/1988 | Daniele et al. . |
| 4,819,018 | | 4/1989 | Moyroud et al. . |
| 4,870,485 | | 9/1989 | Downing et al. . |
| 4,877,939 | * | 10/1989 | Duley et al ..................... 219/121.76 |
| 4,924,477 | | 5/1990 | Gilmore et al. . |
| 4,929,256 | * | 5/1990 | Shepherd ............................. 51/293 |
| 5,127,730 | | 7/1992 | Brelje et al. . |
| 5,245,623 | | 9/1993 | McFarlane . |
| 5,347,303 | | 9/1994 | Kovacs et al. . |
| 5,373,313 | | 12/1994 | Kovacs . |
| 5,444,463 | | 8/1995 | Kovacs et al. . |
| 5,457,536 | | 10/1995 | Kornfield et al. . |
| 5,491,642 | | 2/1996 | Wormell et al. . |
| 5,526,166 | | 6/1996 | Genovese . |
| 5,550,668 | | 8/1996 | Appel et al. . |
| 5,646,765 | | 7/1997 | Laakmann et al. . |
| 5,684,621 | | 11/1997 | Downing . |
| 5,707,788 | * | 1/1998 | Nishio ................................. 430/440 |
| 5,751,437 | | 5/1998 | Parker et al. . |
| 5,754,218 | | 5/1998 | Baek et al. . |
| 5,777,659 | | 7/1998 | Genovese . |
| 5,786,594 | | 7/1998 | Ito et al. . |

(List continued on next page.)

Primary Examiner—Samuel M. Heinrich
(74) Attorney, Agent, or Firm—Abelman, Frayne & Schwab

(57) ABSTRACT

A computer controlled laser material processing system has a plurality of laser sources the beams of which are selectively operable between two modes. In a first raster engraving mode the beams are separated and independently controllable in synchronism with the motions of a beam delivery system to form plural, parallel, spaced apart scan lines on the surface of the workpiece for affecting the surface at high speed. In a second vector cutting mode the beams are combined such that they are collinear and have a power approximately equal to the sum of the powers of each individual laser source for cutting the surface at high power. The system may be switched by moving an optical element which, in the vector mode position, combines the beams and, in the raster mode position, separates the beams by either incrementally adjustably controlling the beams to provide a predetermined pitch between the scanned lines or by fixedly establishing a predetermined angle between the beams coupled with scanning in a variable interleaved pattern to achieve the desired pitch and image quality. Alternatively, an optical element may be inserted in the path of the collinear beams to separate them into parallel or angled beams for use in multi line scanning in the raster mode. The reverse sequence is followed to switch from raster to vector mode.

34 Claims, 8 Drawing Sheets

U.S. PATENT DOCUMENTS

| | | |
|---|---|---|
| 5,790,928 | 8/1998 | Kovacs et al. . |
| 5,807,652 | 9/1998 | Kovacs . |
| 5,808,268 | 9/1998 | Balz et al. . |
| 5,822,354 | 10/1998 | Vitruk . |
| 5,905,577 | 5/1999 | Wilsher et al. . |
| 5,965,042 | * 10/1999 | Saitoh .............................. 219/121.76 |

* cited by examiner

PRIOR ART

LASER MATERIAL PROCESSING SYSTEM WITH MULTIPLE LASER SOURCES APPARATUS AND METHOD

SEQUENCE LISTING

Not Applicable

CROSS-REFERENCES TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Fields of the Invention

The present invention relates generally to apparatuses and methods for engraving and cutting materials using multiple lasers the beams of which can be combined for cutting and deep engraving applications or separated for high speed raster engraving.

2. Discussion of Background and Prior Art a. Prior Laser Material Processing Systems and Beam Delivery Systems

Typically a laser material processing system includes a laser source, a power supply, a CPU for receiving a computer program to control beam positioning and corresponding laser modulation, a control panel, and a beam delivery system.

1. One typical embodiment of an X-Y beam delivery system includes parallel tracks supporting a transverse rail having a reciprocable carriage with a mirror and focusing lens assembly which delivers the laser beam downwardly onto the workpiece under the control of the CPU. See, Garnier U.S. Pat. No. 4,985,780 and Sukhman U.S. Pat. No. 5,051,558 hereby incorporated herein by reference.

2. Another type of beam delivery system is known in the art as a Galvanometer type wherein two mirrors are each supported on orthogonally placed axes of limited-rotation, moving iron type, servo motors with highly linear torque characteristics over a relatively large angle of rotation with position feedback and servo amplifiers. The combined action of the mirrors produces X and Y movements of the laser beam.

Typically, images are engraved onto materials using a raster motion of the laser beam ("raster mode engraving"). As used herein, raster mode engraving means affecting the surface of a workpiece by engraving, removing, modifying, marking, or otherwise interacting with the surface of the workpiece. Using this method, an image is defined by a number of dots of a certain resolution (e.g., 500 dots/inch). The image is then recreated on a material by passing a laser beam back and forth over the material along one axis to engrave one line of dots with each pass in accordance with the information from the original image while stepping in very small increments along an orthogonal axis until the image is completed.

Typically, patterns are cut from materials using a vector motion of the laser beam ("vector mode cutting"). As used herein, vector mode cutting means cutting into or through the surface of a workpiece. Using this method a pattern is applied to a material by moving a beam delivery system simultaneously along X and Y axes in accordance with the path of the desired pattern while applying a controlled amount of laser energy to cut into or through the material.

b. The Problem of Limited Productivity Of Traditional Systems

Productivity is limited by different factors for raster mode engraving and vector mode cutting.

On the one hand, high productivity in raster mode engraving involves removal or modification of a surface of a workpiece at maximum speed at a predetermined power level. However, such high beam delivery motion speeds and the associated high laser beam pulse rates do not produce good results with most materials, and, are accompanied by other serious disadvantages, as set forth below:

1. At high beam delivery system speeds, the required laser pulsing rate can greatly exceed the laser response rate. E.g., if the user is using 1000 dots/inch and the X-Y based beam delivery system is traveling at 100 inches/second, then the laser must be pulsed at 100 kHz. However, $CO_2$ lasers typically achieve 100% modulation only below 5–7 kHz, and above these frequencies the lasers are only partially modulated, making power more and more difficult to control. In the above example, at 100 kHz the laser produces a CW beam, and no image can be produced. Also, high frequency pulsing is difficult to achieve with NdYAG lasers due to Q-switch limitations and variations in peak power for the broad range of modulation frequencies required.

2. High speed beam delivery systems require more expensive motors, drivers, mechanical components, and support electronics, and produce more wear and tear on those components.

3. Speed also affects energy density when a laser pulse is applied to a material. A laser pulse applies a fixed amount of energy to a material. As a beam delivery system moves faster, each pulse is spread over more of the material surface, thereby reducing the energy density.

4. As the beam delivery system operates, it must decelerate in order to change directions and accelerate again to reach operating speed after changing directions. At high speeds it becomes more and more challenging to control laser power and material marking consistency during direction changes, thus, requiring more sophisticated control electronics and motion algorithms. Each change in direction slows down the process, and an increase in top speed alone does not necessarily recover all of the lost time.

On the other hand, high productivity in vector mode cutting involves deep penetration into or through a material at maximum available power at a predetermined speed. However, these high power levels are usually unnecessary in raster mode engraving and the vector mode cutting predetermined speeds are too slow for efficient raster mode engraving applications.

Accordingly, there is still an unfilled need for, and it is an object of the present invention to provide, high productivity in raster mode engraving while overcoming the problems intrinsic to higher speeds and while simultaneously preserving the high productivity of vector mode cutting.

c. Prior Electrophotographic Laser Printers With High Speed Raster Output Scanners The addition of multiple lasers to increase productivity is well known in the reprographics industry for electrostatically discharging drums to form latent images thereon. In a prior system to Genovese in U.S. Pat. No. 5,777,659 there is disclosed the well known technology of the laser printer in which a raster output scanner ("ROS") provides a laser beam that switches on and off according to electronic image data associated with the desired image to be printed exposing the surface of an electrostatically charged photoreceptor (a photosensitive plate, belt, or drum) point by point as the beams are reflected by the facets of a rotating polygon and move across its surface thereby forming a raster of closely spaced scan lines containing a latent image which is then developed with toner and transferred to a sheet of copy paper as in the well known process of electrophotography. In order to obtain an increase in the effective writing speed of the laser imaging system by increasing the rate at which pixels were processed and a desired image completed, Genovese employed dual, independently operated laser beams which simultaneously scanned across or traversed the photoreceptor surface two parallel scan lines spaced apart by a predetermined number of scan lines thereby effectively doubling the throughput capability of the printer. (FIG. 1). Genovese used a single light sensor to measure the intensity of the two light sources which operated the lasers in alternating fashion to maintain uniformity in the image.

An improvement to such a system was disclosed by Ito in U.S. Pat. No. 5,786,594 in which at least one of the multiple lasers was rotatable about an axis parallel to the axis of the photoreceptor whereby the pitch of the multiple scan lines could be controllably adjusted. (FIG. 2).

The same techniques used by Genovese and Ito above were further applied in a system by Balz in U.S. Pat. No. 5,808,268 to facilitate identification and tracking for quality control purposes in a computer controlled, data driven, marking process of scribing or engraving high density indicia, such as, alphanumeric serial numbers or other symbols, on the surface of ceramic substrates or wafers used in the manufacture of electronic components, such as, direct access storage device integrated circuits.

However, none of the above systems disclose, and it is an object of the present invention to provide, a laser material processing system having a high productivity, low wear, delivery system for multiple laser beams which is switchable between a multi-beam, high speed, image engraving raster mode and a combined beam, low speed, pattern cutting vector mode.

BRIEF SUMMARY OF THE INVENTION

Set forth below is a brief summary of the invention which achieves the foregoing and other objects and provides the foregoing and hereafter stated benefits and advantages in accordance with the structure, function and results of the present invention as embodied and broadly described herein. Applicants' invention includes independently both the apparatus and the methods described herein which achieve the objects and benefits of the present invention. Both formats of the invention are described below, and it is applicants' intention to claim both formats even though from time to time below for purposes of clarity and brevity applicants will use either one or the other format to describe various aspects and features of the invention.

One aspect of the invention is a laser material processing system which includes a plurality of laser sources the laser beams of which are switchable between a first mode in which the beams are separated and independently controllable to scan a surface of a workpiece to form a plurality of parallel scan lines spaced apart a predetermined distance for affecting a surface of a workpiece, and a second mode in which the beams are collinear, have a power approximately equal to the sum of the powers of each individual laser source, and are controllable for cutting a workpiece.

Further features of this aspect of the invention include the affecting is a removal or modification of a surface of the workpiece, the first mode is a raster mode and the second mode is a vector mode, the first mode is a higher speed, lower power mode than the second mode, the first mode is operated in synchronism with the motions of a beam delivery system, the affecting and cutting are under the control of a computer, and the predetermined distance is a predetermined number of scan lines.

Further features of this aspect of the invention are that the switch is an optical element movable between a first position corresponding to the first mode and a second position corresponding to the second mode, the switch when in the first position may be either incrementally adjustable to establish a predetermined spacing between the scan lines or nonadjustable and establishing a predetermined fixed angle between the beams which are controllable for reciprocable scanning in an interleaved pattern to achieve an ultimate predetermined spacing between the scan lines.

Still further features of this aspect of the invention are that the switch may be an optical element insertable in the path of the collinear beams to separate the beams into either two parallel beams spaced apart a predetermined distance or into two non-parallel beams spaced apart a predetermined angle for operation in the first mode.

A second aspect of the invention is a method of processing laser materials which includes the step of switching the laser beams of a plurality of laser sources between a first mode in which the beams are separated and independently controllable to form a plurality of parallel scan lines spaced apart a predetermined distance for affecting a surface of a workpiece, and a second mode in which the beams are collinear, have a power approximately equal to the sum of the powers of each individual laser source, and are controllable for cutting a workpiece.

A third aspect of the invention is a laser material processing system which includes a plurality of laser sources the laser beams of which are selectively operable between either a first mode in which the beams are separated and independently controllable to form a number of scan lines spaced apart a predetermined distance for affecting a surface of a workpiece, or a second mode in which at least one of the beams is controllable for cutting a workpiece.

A further feature of this aspect of the invention is that in the second mode the beams are collinear, have a power approximately equal to the sum of the powers of each individual laser source, and are controllable for cutting a workpiece.

Further features of the second and third aspects of the invention are the same as those set forth above as to the first aspect of the invention and are hereby incorporated herein by reference.

The advantages of the present invention include the following:
1. Lower beam delivery system speeds enable lower laser frequency pulsing within the acceptable range of laser modulation parameters.
2. More productivity at lower beam delivery system speeds allows the use of less expensive motion components and less expensive motors and drive electronics, and results in less wear and tear on the beam delivery system.

3. Productivity is increased with each laser beam added to the system without the need to increase the speed of a beam delivery system.
4. Lower beam delivery system speeds result in spreading the laser beam pulses over less material surface area which provides higher energy density on materials for more efficient engraving.
5. Overall time to complete a job is reduced because the number of changes in direction is reduced with each additional line of engraving performed in a single pass of the beam delivery system.
6. Laser power can be used more productively. Power can be combined for most efficient cutting in the vector mode, and power can be split into separate beams producing multiple lines of an image when less power is needed in the raster mode.

BRIEF DESCRIPTION OF THE SEVERAL VIEWS DRAWINGS

DETAILED DESCRIPTION OF THE INVENTION a. The Laser Source And Laser Material Processing Platform

Figure 1:
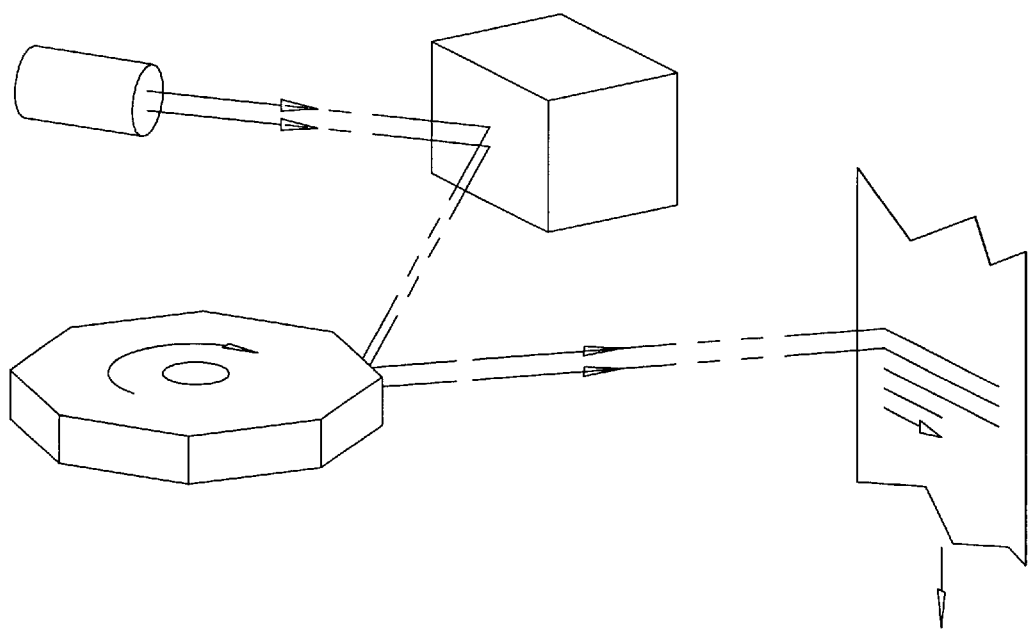
FIG. 1 is a schematic perspective view of a prior art laser printer.
Figure 2:
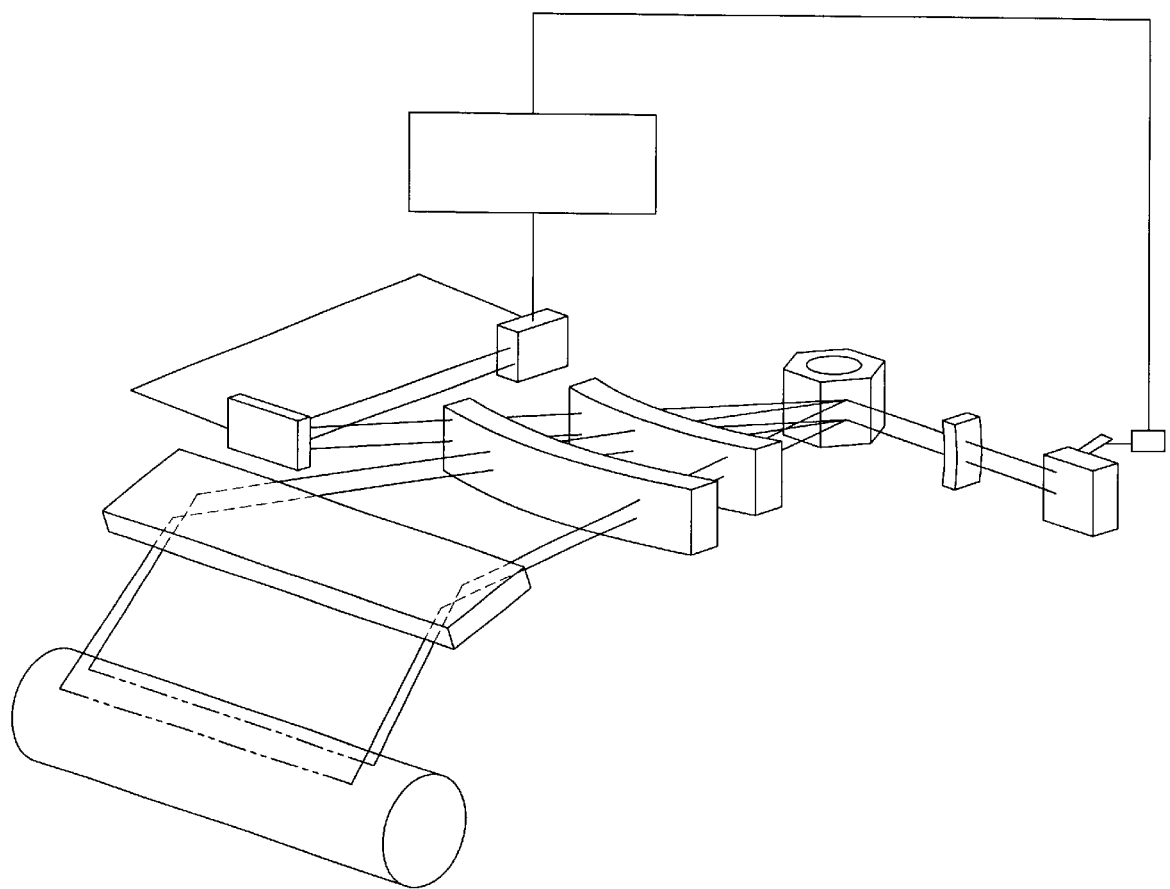
FIG. 2 is a schematic perspective view of another prior art laser printer.
Figure 3:
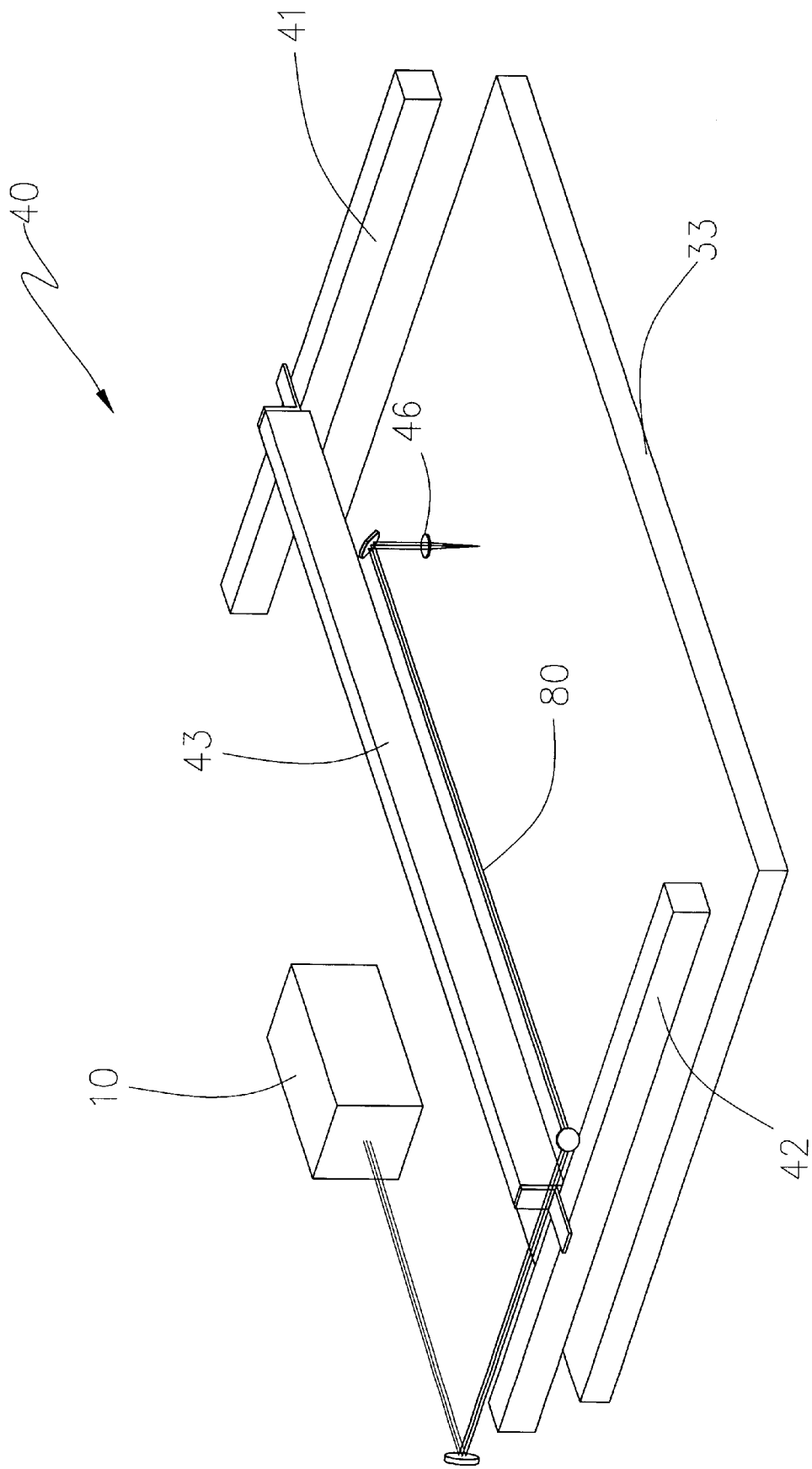
FIG. 3 is a schematic view of an X-Y type beam delivery system which may be used in the laser material processing system of the present invention.
Figure 4:
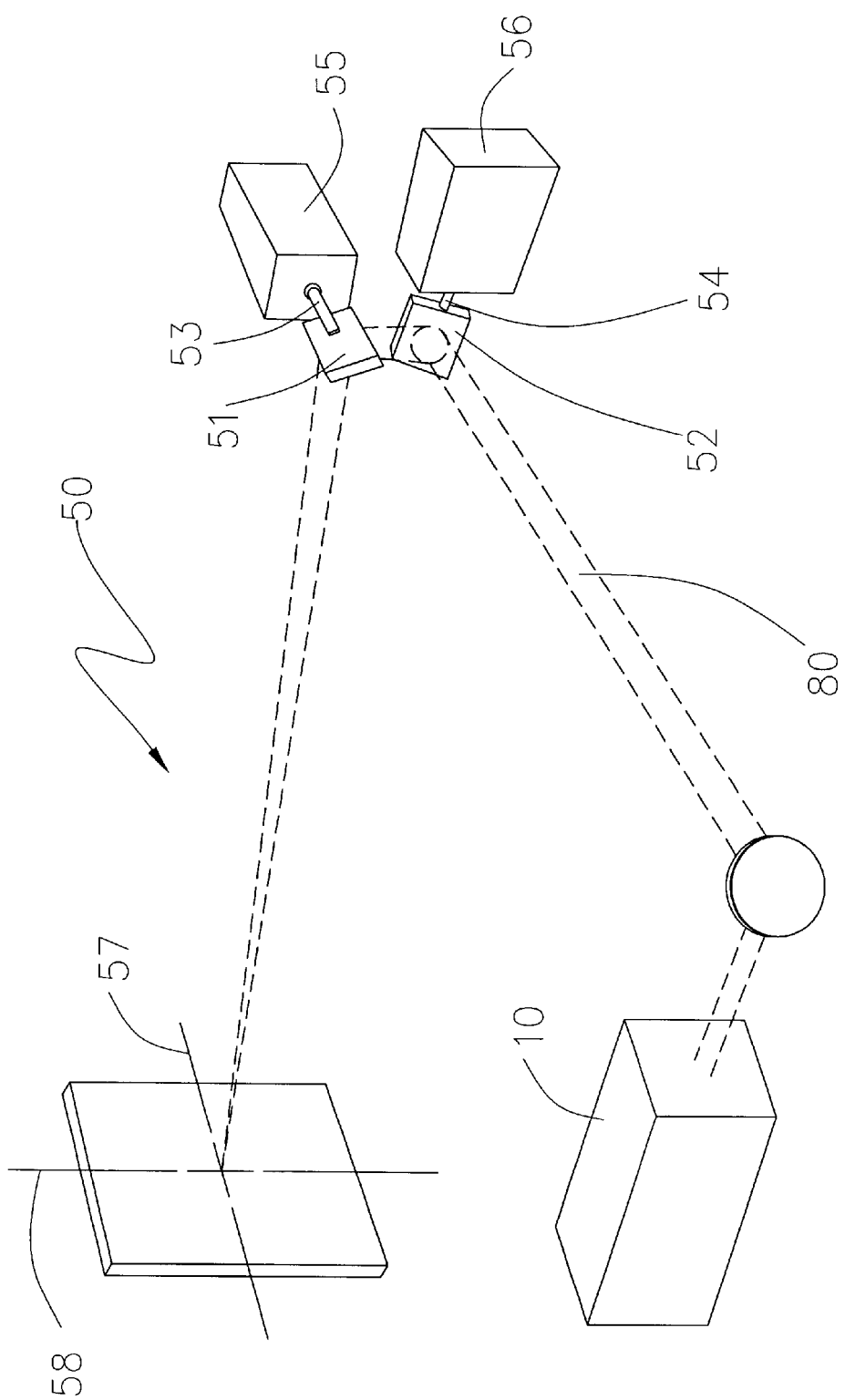
FIG. 4 is a schematic view of a Galvanometer X-Y scanner which is an alternative type beam delivery system which may be used in the laser material processing system of the present invention.
Figure 7:
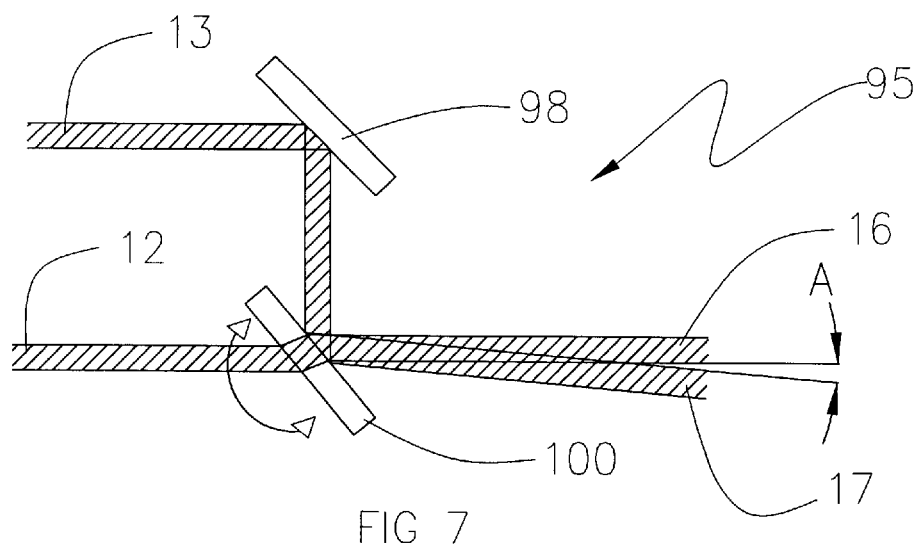
FIG. 7 is a schematic view of a second embodiment of plural optical elements of the present invention which may be inserted into the beam paths of multiple beams to produce a controllable angle between the two beams.
Figure 8:
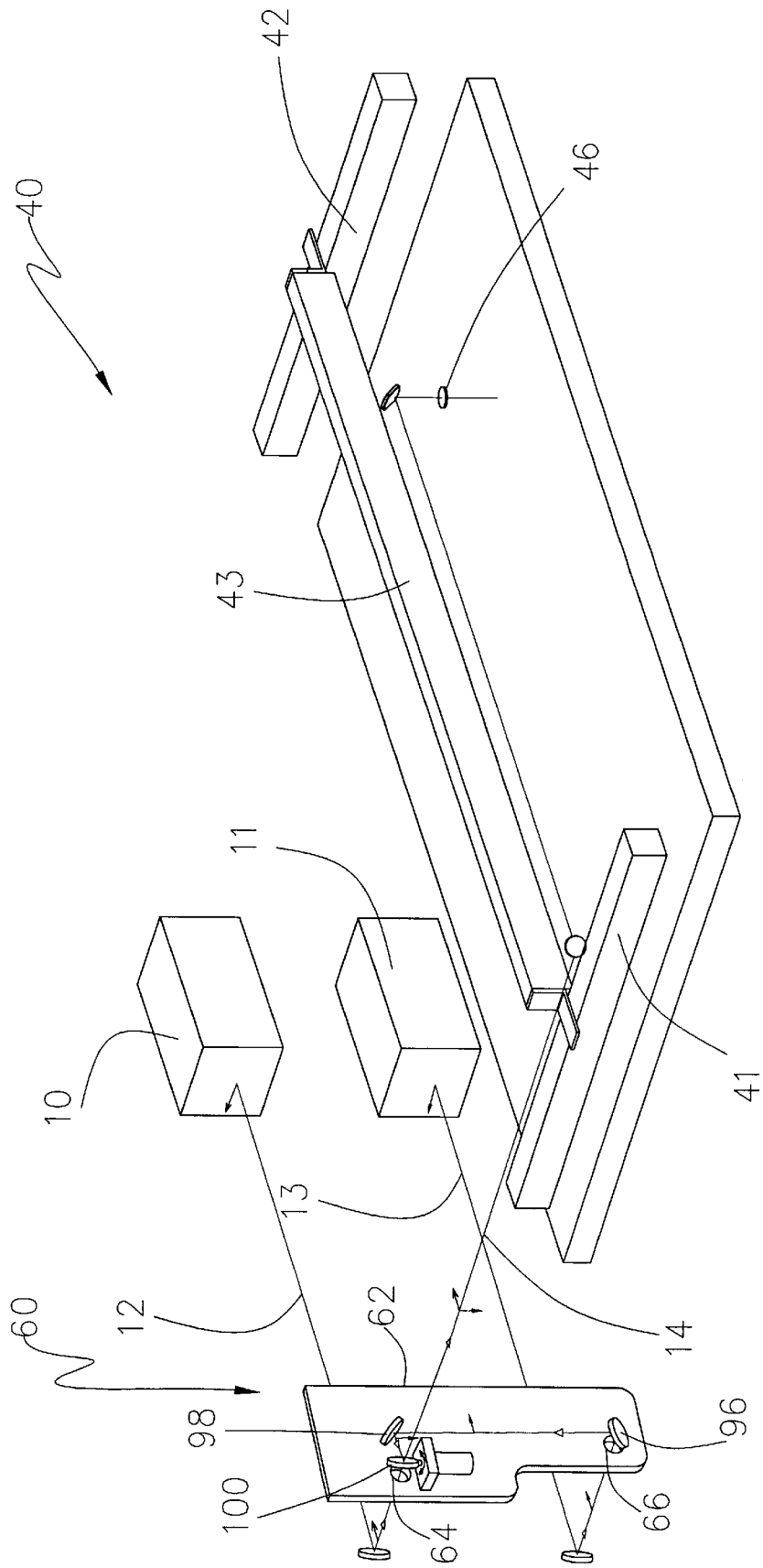
FIG. 8 is a schematic perspective view of a combiner and the beam delivery system of FIG. 3 showing two laser beams combined into one collinear beam.
Figure 9:
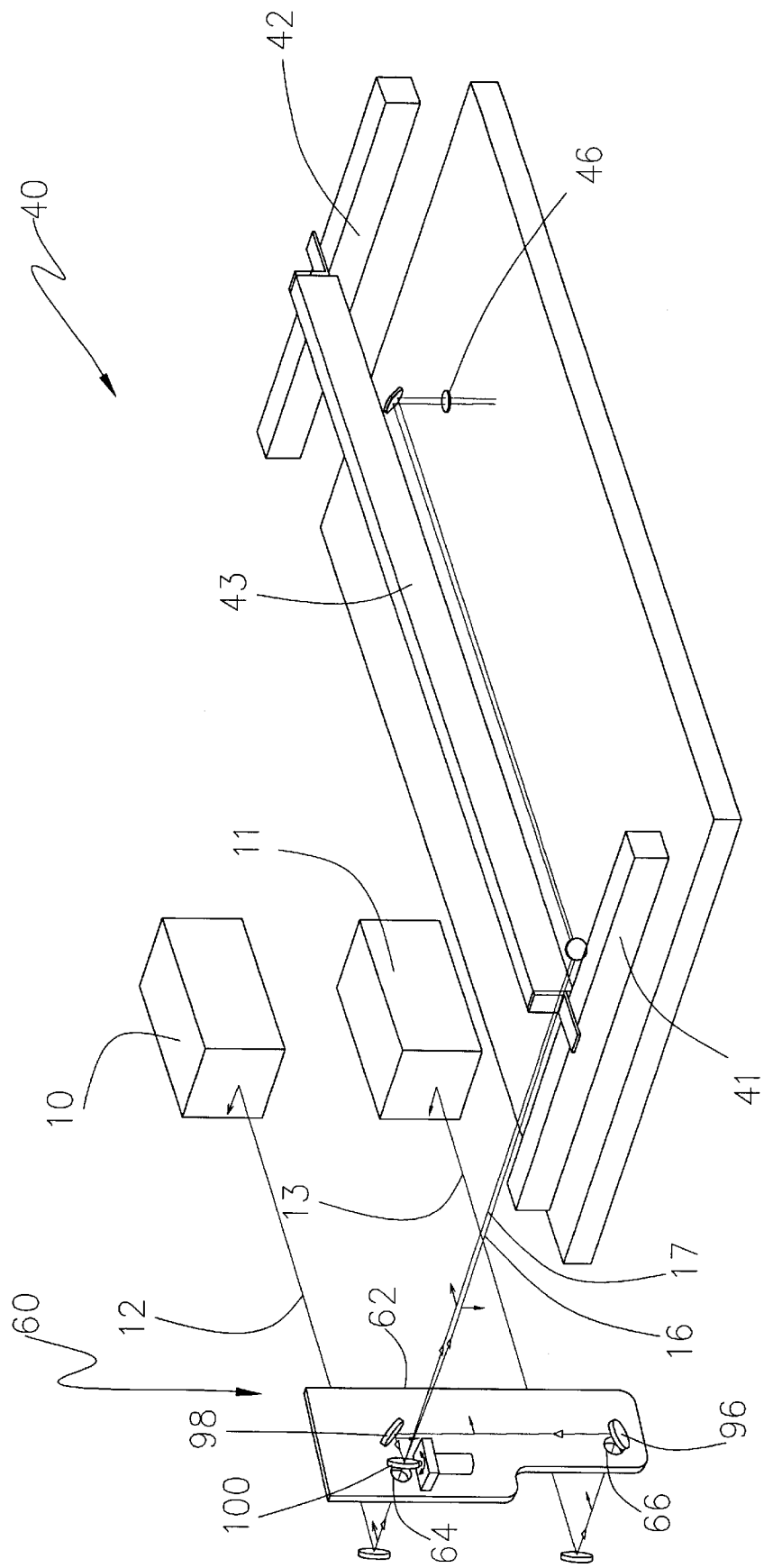
FIG. 9 is a schematic perspective view of a combiner and the beam delivery system of FIG. 3 showing two laser beams maintained at a predetermined spaced relation to each other by slight rotation of one of the optical elements of the combiner. The spaced relation may be parallel, or a predetermined angle.

As is well known in the art, a laser source and laser material processing platform of the present invention include a $CO_2$ laser source 10, 11 supported in a laser system with a power supply, a CPU for controlling the motion system and pulsing the laser, a table for supporting the material to be engraved, modified or cut, a control panel and an X-Y beam delivery system 40 (FIGS. 3, 8, 9). The beam delivery system 40 includes, in one embodiment (FIGS. 3, 8, 9), parallel tracks 41, 42 supporting a transverse rail 43 (Y-motion) (FIGS. 3, 7, 9) having a reciprocable carriage with a mirror assembly with focusing lens 46 (X-motion) which delivers the laser beam 80 downwardly onto the workpiece secured on the work table 33 under the control of the CPU. In another embodiment, an alternative beam delivery system may include a Galvanometer type scanner 50 (FIG. 4) which has its two mirrors 51, 52 each supported on orthogonally placed axes 53, 54 of limited-rotation, moving iron type, servo motors 55, 56. The combined action of the mirrors 51, 52 and servo motors 55, 56 produces X and Y movements of the laser beam 80.

Laser platforms also include, a lift system which allows adjustment of the table 33 to place the workpiece in the focal plane of the focusing lens 46 while giving solid support and stability to the table and workpiece, and an exhaust system to remove smoke, fumes, and debris.

b. The Optical Elements Which Combine The Multiple Laser Beams In The Vector Cutting Mode In order to simplify the explanation of the present invention, the following discussion describes the present invention in terms of the two laser sources 10, 11 shown in FIGS. 8, 9. However, those of ordinary skill in the art will understand from this disclosure that an infinite number of laser sources may be used in the configurations disclosed herein. Accordingly, it is the intention of the applicants that the scope of the invention be interpreted to include structures having such a plurality of laser sources.

As seen in FIGS. 8, 9 two laser sources 10, 11 are each separately mounted in the laser system. After alignment the beam paths 12, 13 of the laser sources 10, 11 of the present invention coincide with (i.e., are co-linear with) the optical axis 14 of the beam delivery system of the laser system.

As seen in FIGS. 8, 9 the combiner 60 of the present invention is mounted in the laser system and includes a plate 62 having an aperture 64 for passing beam path 12 of laser source 10, an aperture 66 for passing beam path 13 of laser source 11, and supporting a first 900 turning mirror 96 and a second 90° turning mirror 98 for reflecting beam path 13 onto one optical coated surface of optical element 100 supported on plate 62 while beam path 12 is directed onto the opposite surface of the optical element 100.

As best seen in FIG. 8 beam paths 12, 13 are both linearly polarized with the polarization vectors parallel to each other as they exit the laser sources 10, 11. Beam path 13 is directed through two reflections by mirrors 96 and 98 of combiner 60 which rotate the polarization vector through 90 degrees so that the polarization vector of beam 13 is perpendicular to the polarization vector of beam 12 when it contacts the coated surface of the optical element 100. The optical element 100 has been coated to reflect light polarized in a first direction while transmitting light polarized in a direction perpendicular to the first direction, as is well know to those of ordinary skill in the art. The optical element 100 is positioned so that beam path 12 passes through the one surface of the optical element 100 while the beam path 13 is reflected from the other surface of the optical element 100 which has been coated as described above. Beam combining can also be accomplished using uncoated optics positioned to use the Brewster angle, as is well known to those of ordinary skill in the art.

Figure 5:
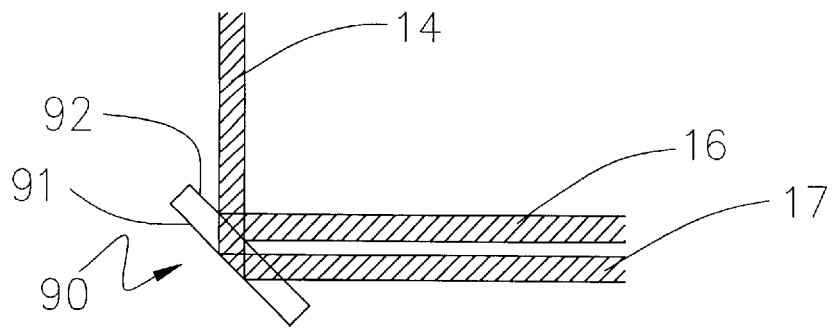
FIG. 5 is a schematic view of an optical element of the present invention which may be inserted into the beam path of a combined beam to re-separate it into two parallel beams.
Figure 6:
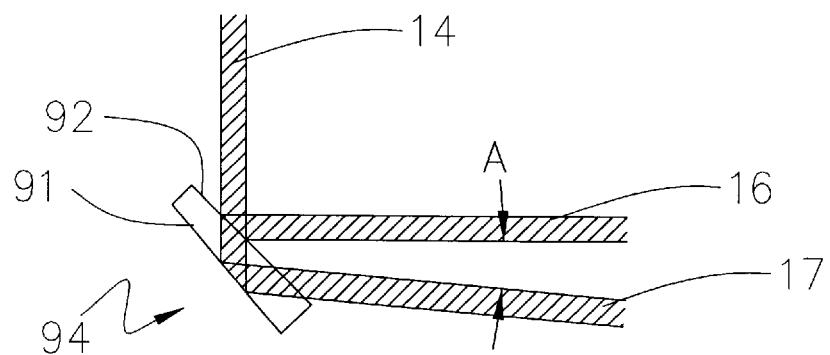
FIG. 6 is a schematic view of a first embodiment of an optical element of the present invention which may be inserted into the beam path of a combined beam to re-separate it into two beams separated by a predetermined angle.

The beam paths 12, 13 exiting optical element 100 of combiner 60 are now combined 14 and collinear. The power of the output beam is the approximate sum of the powers of the individual beams 12, 13. Because the beam paths 12, 13 and the optical axis of the beam delivery system of the laser material processing system have been aligned, the beam paths and optical axis coincide without any further alignment adjustment. The advantages outline above for the vector cutting mode are now achievable.

c. The Optical Elements Which Separate The Beams In The Raster Engraving Mode As is well known to those of ordinary skill in the art, producing a controlled separation between two laser beams 12, 13 that have been combined into a single collinear beam 14, such as the laser beam of FIG. 8, can be accomplished in a variety of ways. As seen in FIG. 5 one way is to insert an optical element 90 having parallel reflective optical surfaces into the path of the combined beam 14, one surface 91 having a 100% reflective coating and the other surface 92 having a coating which reflects only light of one polarization. The reflected beams 16, 17 are two parallel beams. Another way is shown in FIG. 6 in which the optical surfaces 91, 92 of the optical element 94 are coated similarly to the surfaces of the element of FIG. 5 but are not parallel, and the reflected beams 16, 17 are separated by a fixed angle A. The preferred mode, however, is shown in FIG. 7 in which two optical elements 98, 100 are inserted separately into the paths of two beams 12, 13 prior to their being combined. In this latter case if optical element 100 is made moveable, then a slight tilt or rotation of optical element 100 is able to switch the output beams between one mode in which the output beams are collinear 14 (FIG. 8), and another mode in which the output beams 16,17 (FIGS. 7, 9) are separated by a small fixed angle A. These two modes are, respectively, the vector cutting mode and the raster engraving mode, as more fully described below.

As seen in FIG. 8, the beams 12, 13 of the two lasers shown are combined into a single collinear beam 14 the power of which is the approximate sum of the individual power of each laser source 10, 11. This mode is the vector cutting mode of operation and is used for cutting patterns where more power is necessary to obtain a deep, rapid cut.

Figure 10:
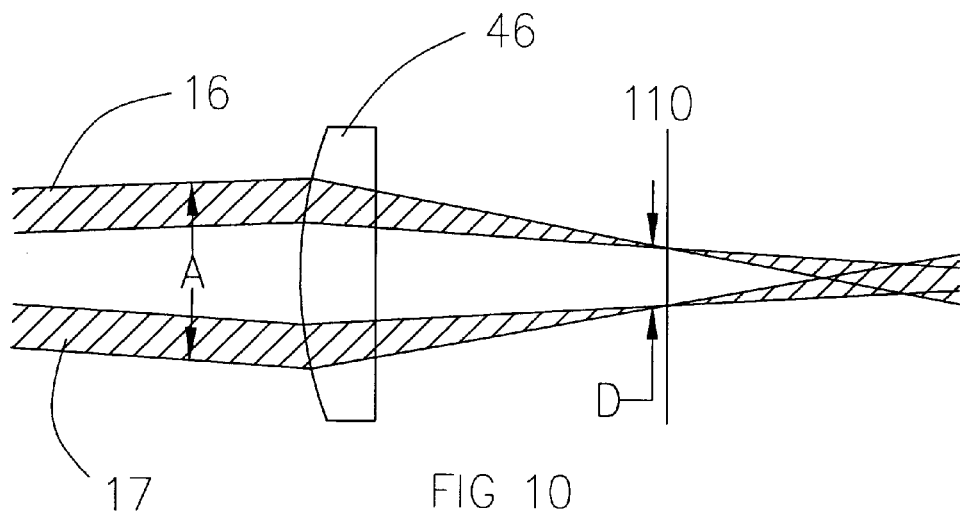
FIG. 10 is an enlarged schematic view of one embodiment of the dual laser beams of FIG. 9 of the present invention showing two non-parallel laser beams focused to produce multiple scan lines in the raster engraving mode.
Figure 11:
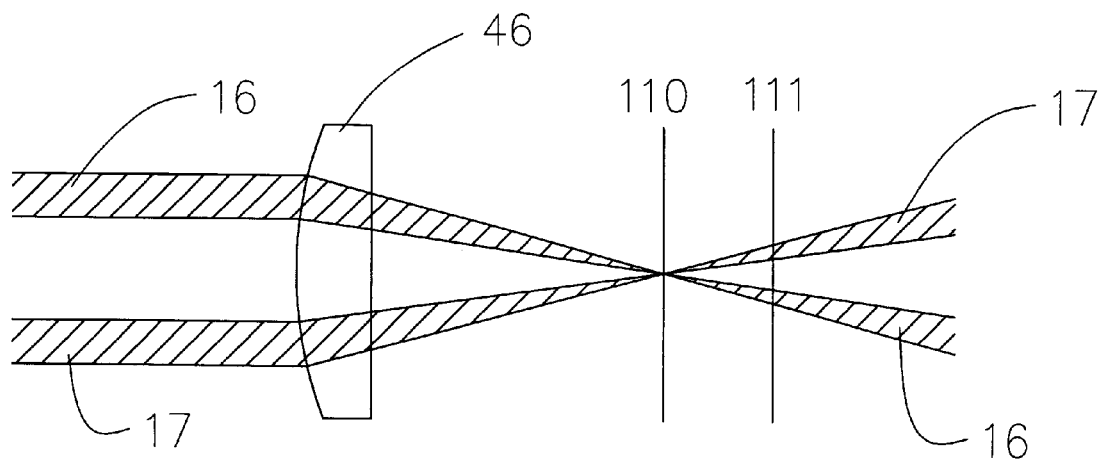
FIG. 11 is an enlarged schematic view of a second embodiment of the dual lasers of FIG. 9 of the present invention showing two parallel laser beams focused to produce multiple lines in the raster engraving mode.

As seen in FIG. 9, the beams 12, 13 of the dual lasers shown are separated into two beams 16, 17 having a predetermined spaced apart relationship (angle A) as a result of a slight rotation (arrow), preferably, of optical element 100. (Alternatively, the same result may also be achieved by slightly tilting mirror 96 or 98 (FIGS. 8, 9) instead). This mode is the raster engraving mode of operation and is used for engraving materials where speed is more important than power to obtain a high throughput. As mentioned above, the beams 16, 17 of FIG. 9 may be parallel and are then focused by focusing lens 46 at a focal plane 110 that is closely adjacent the plane 111 of the workpiece as seen in FIG. 11, or, preferably, may be at a predetermined angle A relative to each other as seen in FIG. 10 such that when focused by lens 46 two separate and independent beams are produced at the focal plane 100, as more fully described below.

Producing a controlled separation between two laser beams that have been combined into a single collinear beam 14, such as the laser beam of FIG. 8, at the point of interaction with the material to be processed can be accomplished in two ways. As seen in the first method of FIG. 6, an optical element 94 deflects the beams so that there is a fixed but controllable angle A between them. As described above, the same result can be achieved by inserting optical elements 98, 100 in the paths of the beams 12, 13 before the beams are combined and rotating optical element 100 a small predetermined amount (FIGS. 7, 9). When the angled beams are focused by the lens 46 (FIG. 10), the angle translates into a fixed distance D between the lines burned onto the material. This is the recommended method. As seen In the second method (FIG. 11), an optical element 90 (FIG. 5) separates the beams 16, 17 so that they are parallel with a fixed distance between them. Then by moving away from the focal plane 110 toward plane 111 (FIG. 11) two distinct beams 16, 17 with a controllable separation distance can be achieved. This second method has the disadvantage that the diameter of the spot increases when moving away from the focal plane 110. However, this compromise can be acceptable for some applications.

As described earlier, in the raster mode (FIGS. 10, 11) images are defined by a number of individual dots and are transferred to the material by engraving those dots onto the material with a laser. The quality of the resulting image created on the material being engraved is dependant on the resolution of the dots defining the original image. If the original image is defined by 250 dpi (dots per inch, usually a square of 250 dots in the X direction and 250 dots in the Y direction), then the resulting engraved image will be coarser than if the original image were defined by 500 dpi. However, at 250 dpi the image can be recreated on the material faster because fewer dots are required, 250 dots in the one case versus 500 dots in the other case. There Is a tradeoff between productivity of the laser system and quality of the images reproduced. This tradeoff is lessened by the addition of the multiple beam engraving mode, i.e., the raster engraving mode, of the present invention. Two or more lines of dots can be reproduced in a single pass with multiple beams. E.g., with two beams a 500 dpi image can be reproduced in the time it would take a single beam to produce a 250 dpi image, giving the user the speed advantage of 250 dpi resolution and the quality of 500 dpi resolution. Even with this advantage the user may still want to adjust the resolution of the image even with multiple beams to selectively enhance quality or productivity. Therefore, an important aspect of the invention is the ability to reproduce images at user selectable resolutions while still taking advantage of multiple beam engraving. This capability can be provided using two different methods.

The first and most straight forward method is to adjust the angle A between the beams in fine increments by rotating element 100 (FIG. 7) when in the raster engraving mode in order to provide the needed spacing D. (FIG. 10). For example, to reproduce 1000 dpi, the spacing between each beam must be 0.001 inch, and for 500 dpi the spacing must be 0.002 inch. This method requires very fine control over the rotation of the mirror 100 which adjusts the angle A between the beams 16, 17 but provides the user with maximum flexibility.

A second less flexible, but less expensive, approach to reproducing multiple resolutions is to use a fixed angle A and interleave the lines of the image. For example, if an angle A is chosen which provides a distance between focused dots of 0.004 inches or 250 lines per inch, then resolutions of 250, 500 and 1000 dpi can be reproduced by controlling the distance the beam delivery system moves between passes and choosing the lines of the image to print accordingly. For example, to reproduce a 1000 dpi image with a beam spacing of 250 dpi the beam delivery system 40, 50 would step in increments of 0.001 inches. With the first pass of the beam delivery system, the electronics would direct the laser beams 16, 17 to produce the first and fourth lines of the image, with the second pass the second and fifth lines of the image, with the third pass the third and sixth lines of the image, and so on. Gradually, the image would be filled in as the beam delivery system progresses. The draw back to this method is apparent when an image consists of a number of lines not evenly divisible by the spacing between the beams. In this case, the remaining number of lines at the end of the image may have to be reproduced by turning off one of the lasers and printing one line at a time, and, thus, some productivity advantage is lost. However, this becomes much less of an issue as the images become larger and the benefit is that the mirror controlling the angle between beams only needs to move between two positions, combining the beams or splitting them at one fixed angle.

To realize the benefits of the above disclosure, two additional features must be added to the system. One is a mechanism 90, 94, or 95 for switching between the two states of operation. In one state the beams are separated so that they produce two distinct and separate marks on the material with the distance between the marks being controllable to produce multiple simultaneous lines when in the raster engraving mode. In the other state they are collinear and the powers are summed for the vector cutting mode. This switch 90, 94, or 95 can be as simple as physically inserting optical elements 90 or 94, or rotating optical element 100 controlling the beam separation.

The other feature is an enhancement to the CPU which directs the lasers 10, 11 and beam delivery system 40, 50 so that it can independently control multiple lasers 10, 11. The CPU must be able to switch between two modes of operation. In one mode the output of each laser is independently modulated to apply independent lines of an image to a material simultaneously and in synchronization with the motions of the beam delivery system in raster operation. In the other mode modulation of each laser must be tied together so that they act as one unit to sum the power output for vector operation. The above description is not limited to two lasers.

In another embodiment of the present invention the advantages of the high speed low power raster engraving mode may be achieved by operating the laser material processing system of the present invention in the raster engraving mode in which the beams are separated and independently controllable to simultaneously form a plurality of parallel scan lines spaced apart a predetermined distance for removing a portion of the material from the surface of a workpiece, and in the vector cutting mode in which only one of the multiple beams is employed and controlled for cutting the surface of a workpiece. This embodiment obviously will not be able to achieve optimal cutting power or efficiency as when both beams are collinear and operated in the vector cutting mode. Nonetheless, this embodiment achieves much of the advantage of the present invention and may be satisfactory in low power cutting applications.

The foregoing description of a preferred embodiment and best mode of the invention known to applicants at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A laser material processing system comprising:
    a plurality of laser sources the laser beams of which are switchable between
        a first mode in which the beams are separated and independently controllable to form a plurality of parallel scan lines spaced apart a predetermined distance for affecting a surface of a workpiece, and
        a second mode in which the beams are collinear, have a power approximately equal to the sum of the powers of each individual laser source, and are controllable for cutting a workpiece.

2. The system of claim 1 wherein the affecting further comprises:
    a removal or modification of the surface of the workpiece.

3. The system of claim 1 further comprising:
    the first mode is a raster mode and the second mode is a vector mode.

4. The system of claim 1 further comprising:
    the first mode is a higher speed, lower power mode than the second mode.

5. The system of claim 1 further comprising: the first mode being in synchronism with the motions of a beam delivery system.

6. The system of claim 1 further comprising:
    the affecting and cutting being under the control of a computer.

7. The system of claim 1 further comprising:
    the switch being an optical element movable between a first position corresponding to the first mode and a second position corresponding to the second mode.

8. The system of claim 7 further comprising:
    the switch when in the first position being incrementally adjustable to establish a predetermined spacing between the scan lines.

9. The system of claim 7 further comprising:
    the switch when in the first position being nonadjustable and establishing a predetermined fixed angle between the beams which are controllable for reciprocable scanning in an interleaved pattern to achieve an ultimate predetermined spacing between the scan lines.

10. The system of claim 1 further comprising:
    the switch being an optical element insertable in the path of the collinear beams to separate the beams into two parallel beams spaced apart a predetermined distance for operation in the first mode.

11. The system of claim 1 further comprising:
    the switch being an optical element insertable in the path of the collinear beams to separate the beams into two non-parallel beams spaced apart a predetermined angle for operation in the first mode.

12. The system of claim 1 further comprising:
    the predetermined distance is a predetermined number of scan lines.

13. A method of processing laser materials comprising the step of:
    switching the laser beams of a plurality of laser sources between
        a first mode in which the beams are separated and independently controllable to form a plurality of parallel scan lines spaced apart a predetermined distance for affecting a surface of a workpiece, and a second mode in which the beams are collinear, have a power approximately equal to the sum of the powers of each individual laser source, and are controllable for cutting a workpiece.

14. The method of claim 13 wherein the affecting step further comprises the step of:

removing or modifying the surface of the workpiece.

15. The method of claim 13 further comprising the step of:

operating the first mode as a raster mode and the second mode as a vector mode.

16. The method of claim 13 further comprising the step of:

operating the first mode at a higher speed and lower power than the second mode.

17. The method of claim 13 further comprising the step of:

synchronizing the first mode with the motions of a beam delivery system.

18. The method of claim 13 further comprising the step of:

computer controlling the affecting and cutting steps.

19. The method of claim 13 further comprising the step of:

switching between the modes by moving an optical element between a first position corresponding to the first mode and a second position corresponding to the second mode.

20. The method of claim 19 further comprising the step of:

incrementally adjusting the switch when in the first position to establish a predetermined spacing between the scan lines.

21. The method of claim 19 further comprising the steps of:

moving the switch to a fixed first position to establish a predetermined fixed angle between the beams and reciprocably scanning the beams in an interleaved pattern to achieve an ultimate predetermined spacing between the scan lines.

22. The method of claim 13 further comprising the step of:

switching between modes by inserting an optical element in the path of the collinear beams to separate the beams into two parallel beams spaced apart a predetermined distance for operation in the first mode.

23. The method of claim 13 further comprising the step of:

switching between modes by inserting an optical element in the path of the collinear beams to separate the beams into two non-parallel beams spaced apart a predetermined angle for operation in the first mode.

24. The method of claim 13 further comprising the step of:

separating the laser beams in the first mode by a predetermined number of scan lines.

25. A laser material processing system comprising:

a plurality of laser sources the laser beams of which are selectively operable in either a first mode in which the beams are separated and independently controllable to form a plurality of parallel scan lines spaced apart a predetermined distance for affecting a surface of a workpiece, or a second mode in which at least one of the beams is controllable for cutting a workpiece.

26. The system of claim 25 where the affecting further comprises:

a removal or modification of the surface of the workpiece.

27. A method of processing laser materials comprising the steps of:

selectively operating the laser beams of a plurality of laser sources in either a first mode in which the beams are separated and independently controllable to form a plurality of parallel scan lines spaced apart a predetermined distance for affecting a surface of a workpiece, or a second mode in which at least one of the beams is controllable for cutting a workpiece.

28. The method of claim 27 wherein the affecting step further comprises the step of:

removing or modifying the surface of the workpiece.

29. A laser material processing system comprising:

a plurality of laser sources the laser beams of which are selectively operable between either a first mode in which the beams are separated and independently controllable to form a number of scan lines spaced apart a predetermined distance for affecting a surface of a workpiece, or a second mode in which at least one of the beams is controllable for cutting a workpiece.

30. The system of claim 29 wherein the affecting further comprises:

a removal or modification of the surface of the workpiece.

31. The system of claim 29 further comprising:

in the second mode the beams are collinear, have a power approximately equal to the sum of the powers of each individual laser source, and are controllable for cutting a workpiece.

32. A method of processing laser materials comprising the step of:

selectively operating the laser beams of a plurality of laser sources between either a first mode in which the beams are separated and independently controllable to form a number of scan lines spaced apart a predetermined distance for affecting a surface of a workpiece, or a second mode in which at least one of the beams is controllable for cutting a workpiece.

33. The method of claim 32 wherein the affecting step further comprises the step of:

removing or modifying the surface of the workpiece.

34. The method of claim 32 further comprising the step of:

operating the lasers in the second mode such that the beams are collinear, have a power approximately equal to the sum of the powers of each individual laser source, and are controllable for cutting a workpiece.

* * * * *